US007143052B2

(12) United States Patent
LaSalle et al.

(10) Patent No.: US 7,143,052 B2
(45) Date of Patent: Nov. 28, 2006

(54) TRANSITIVE TRUST NETWORK

(75) Inventors: Ryan Matthew LaSalle, Chicago, IL (US); Carie Anne Bottenfield, Chicago, IL (US); Sanjay Mathur, Chicago, IL (US); Kyle William Smith, Naperville, IL (US)

(73) Assignee: Accenture Global Services GmbH (CH)

( * ) Notice: Subject to any disclaimer, the term of this patent is extended or adjusted under 35 U.S.C. 154(b) by 168 days.

(21) Appl. No.: 09/945,469

(22) Filed: Aug. 30, 2001

(65) Prior Publication Data

US 2003/0046097 A1 Mar. 6, 2003

(51) Int. Cl.
*G06F 9/44* (2006.01)
*G06F 17/50* (2006.01)

(52) U.S. Cl. ............................................. 705/7; 705/1
(58) Field of Classification Search .................... 705/1, 705/26, 80, 35, 500, 7, 10, 11, 400
See application file for complete search history.

(56) References Cited

U.S. PATENT DOCUMENTS

| 5,884,272 | A | 3/1999 | Walker et al. | |
|---|---|---|---|---|
| 5,907,677 | A | 5/1999 | Glenn et al. | |
| 6,029,141 | A | 2/2000 | Bezos et al. | |
| 6,223,165 | B1 | 4/2001 | Lauffer | |
| 2002/0078003 | A1* | 6/2002 | Krysiak et al. | 707/1 |
| 2002/0128939 | A1* | 9/2002 | Tarrant | 705/35 |
| 2002/0152086 | A1* | 10/2002 | Smith et al. | 705/1 |
| 2003/0018487 | A1* | 1/2003 | Yong et al. | 705/1 |
| 2003/0070070 | A1* | 4/2003 | Yeager et al. | 713/157 |

FOREIGN PATENT DOCUMENTS

EP 1 052 582 A2 * 11/2000

OTHER PUBLICATIONS

Abrams et al. "Is Your E-Business trustworthy?"IBMGlobal Services; Aug. 2001.*
"Identity Uncertainity Still Dogs E-Commerce" DIALOG, File 636, 04502976; Dec. 6, 1999.*

* cited by examiner

*Primary Examiner*—Igor N. Borissov
(74) *Attorney, Agent, or Firm*—Banner & Witcoff, Ltd.

(57) ABSTRACT

Methods, data structures, and systems by which entities can efficiently discover, extend, validate and establish business relationships over a digital network are disclosed. A transitive trust system can be utilized by any number of interconnected entities in which at least two of the entities are capable of sharing information. One or more entity trust lists contain, for at least two of the entities, at least one characteristic. Each characteristic can, for example, describe or pertain to the actual or perceived dependability, reliability and/or credibility of an entity. The system also includes at least one transactional trust list that contains at least one parameter relative to an exchange between at least two of the entities through at least one degree of separation between the entities. The transactional trust list can, for example, be a listing of any type of parameters that define or describe business exchanges within a particular industry segment. The transactional trust list can also list information about the types of transactional activities that can take place and proxy actions available to cooperating entities. The system retrieves information from the entity trust list and the transactional trust list in order to provide a framework for at least two of the entities to establish relationships with one another.

20 Claims, 15 Drawing Sheets

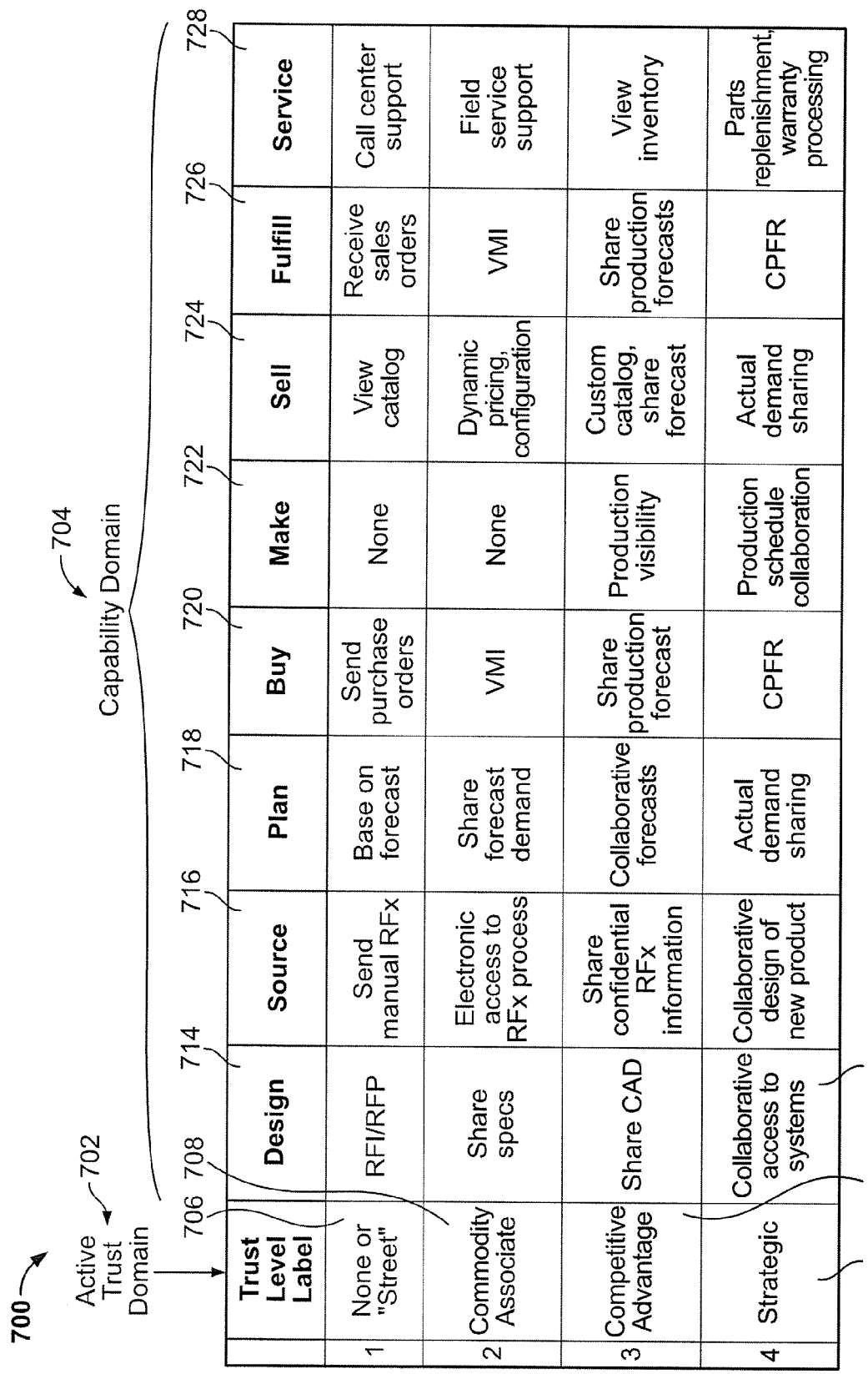

FIG. 7

| Trust Level Label | Design | Source | Plan | Buy | Make | Sell | Fulfill | Service |
|---|---|---|---|---|---|---|---|---|
| 1 None or "Street" | RFI/RFP | Send manual RFx | Base on forecast | Send purchase orders | None | View catalog | Receive sales orders | Call center support |
| 2 Commodity Associate | Share specs | Electronic access to RFx process | Share forecast demand | VMI | None | Dynamic pricing, configuration | VMI | Field service support |
| 3 Competitive Advantage | Share CAD | Share confidential RFx information | Collaborative forecasts | Share production forecast | Production visibility | Custom catalog, share forecast | Share production forecasts | View inventory |
| 4 Strategic | Collaborative access to systems | Collaborative design of new product | Actual demand sharing | CPFR | Production schedule collaboration | Actual demand sharing | CPFR | Parts replenishment, warranty processing |

TRANSITIVE TRUST NETWORK

CROSS-REFERENCE TO RELATED APPLICATIONS

The present application is related to co-pending application Ser. No. 09/817,917, filed Mar. 26, 2001, which describes and claims methods and apparatus for processing data in a content network, and which is assigned to the same assignee as the present application. Co-pending application, Ser. No. 09/817,917, is hereby incorporated by reference in its entirety.

FIELD OF THE INVENTION

The present invention relates to the field of establishing business relationships between entities and, in particular, to methods and systems by which entities can efficiently establish new business relationships over a network.

DESCRIPTION OF THE RELATED ART

In the business world, it is important for manufacturers, retailers, and other types of businesses to be able to have a means for establishing trust relationships with one another and with new partners. Today this is of particular importance since a significant amount of business is conducted over wide area networks, such as the Internet.

In the past, if one company was interested in entering into a business relationship with another, methods for either of the companies to determine whether the other was trustworthy included contacting the Better Business Bureau or a credit-reporting agency. Another approach was to make inquiries about a company's reputation.

Unfortunately, these labor-intensive prior-art approaches only provide limited information and are not automated. Moreover, these approaches do not help entities to establish trust relationships with one another and/or with new business partners. Consequently, there is need for a solution that enables entities to discover, extend, validate and establish business relationships over a digital network.

SUMMARY OF THE INVENTION

The present invention overcomes the problems and limitations of the prior art by providing methods and systems by which entities can efficiently establish new business relationships over a network. For example, if a buyer attempts to establish a business relationship with (e.g. tries to buy goods on credit over the Internet from) a seller, the present invention enables the seller to determine whether the buyer is trustworthy, thereby allowing the seller to decide whether to enter into the business relationship with the buyer. In order to determine whether the buyer is trustworthy, the present invention enables the seller to make inquiries of companies—within an acceptable and/or specified degree of separation—which the seller trusts. After evaluating the results of the inquiries, the seller can make an informed decision whether to enter into the proposed business relationship. In sum, the various embodiments disclosed in this specification provide solutions that enable entities to discover, extend, validate and establish business relationships over a network.

In one embodiment, the present invention provides a system that permits a seeking entity to establish a new business relationship with a sought entity. An inquiry receiving component is capable of receiving an inquiry from the seeking entity. A response receiving component is capable of receiving a response, which indicates that there is an existing relationship between the sought entity and an intermediate entity. And, a confirming component is capable of confirming, based on the response, that the new relationship may be established between the seeking and sought entities. (Entity or entities can include individuals, partners, corporations, companies, partnerships, and/or any other type of business structures.)

In another embodiment, the present invention provides a transitive trust system that can be utilized by any number of interconnected entities in which at least two of the entities are capable of sharing information. One or more entity trust lists contain, for at least two of the entities, at least one characteristic. Each characteristic can, for example, describe or pertain to the actual or perceived dependability, reliability and/or credibility of an entity. The system also includes at least one transactional trust list that contains at least one parameter relative to an exchange between at least two of the entities through at least one degree of separation between the entities. The transactional trust list can, for example, be a listing of any type of parameters that define or describe business exchanges within a particular industry segment. The transactional trust list can also list information about the types of transactional activities that can take place and proxy actions available to cooperating entities. In this embodiment, the system retrieves information from the entity trust list and the transactional trust list in order to provide a framework for at least two of the entities to establish relationships with one another.

In yet another embodiment, the present invention provides a transitive trust system like the one discussed above. However, the system also includes a capability domain and activity trust level database for the entities. The capability domain can allow classification of the role or function that one entity serves to another, such as, for example, by defining or describing the way the entities interact. The capability domain can classify the level at which information is shared or provided to any entity, thereby establishing the closeness of the trust relationship. The activity trust level database can store information or parameters, which can be used to quantify the level or nature of the relationship between entities.

In a further embodiment, the present invention provides a method of establishing relationships between at least two entities. A second entity receives a contact identifying a first entity. The second entity checks a list of trusted entities to determine if the first entity is a trusted entity. If the first entity is not a trusted entity, the second entity queries the trusted entities and specifies a predetermined degree of separation. A relationship between the first and second entities is then established if the first entity is known by at least one of the trusted entities.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 7 is a table of roles and trust levels of business partners indicating the concept of activity trust vs. capability domains;

DETAILED DESCRIPTION OF THE INVENTION

Figure 1:
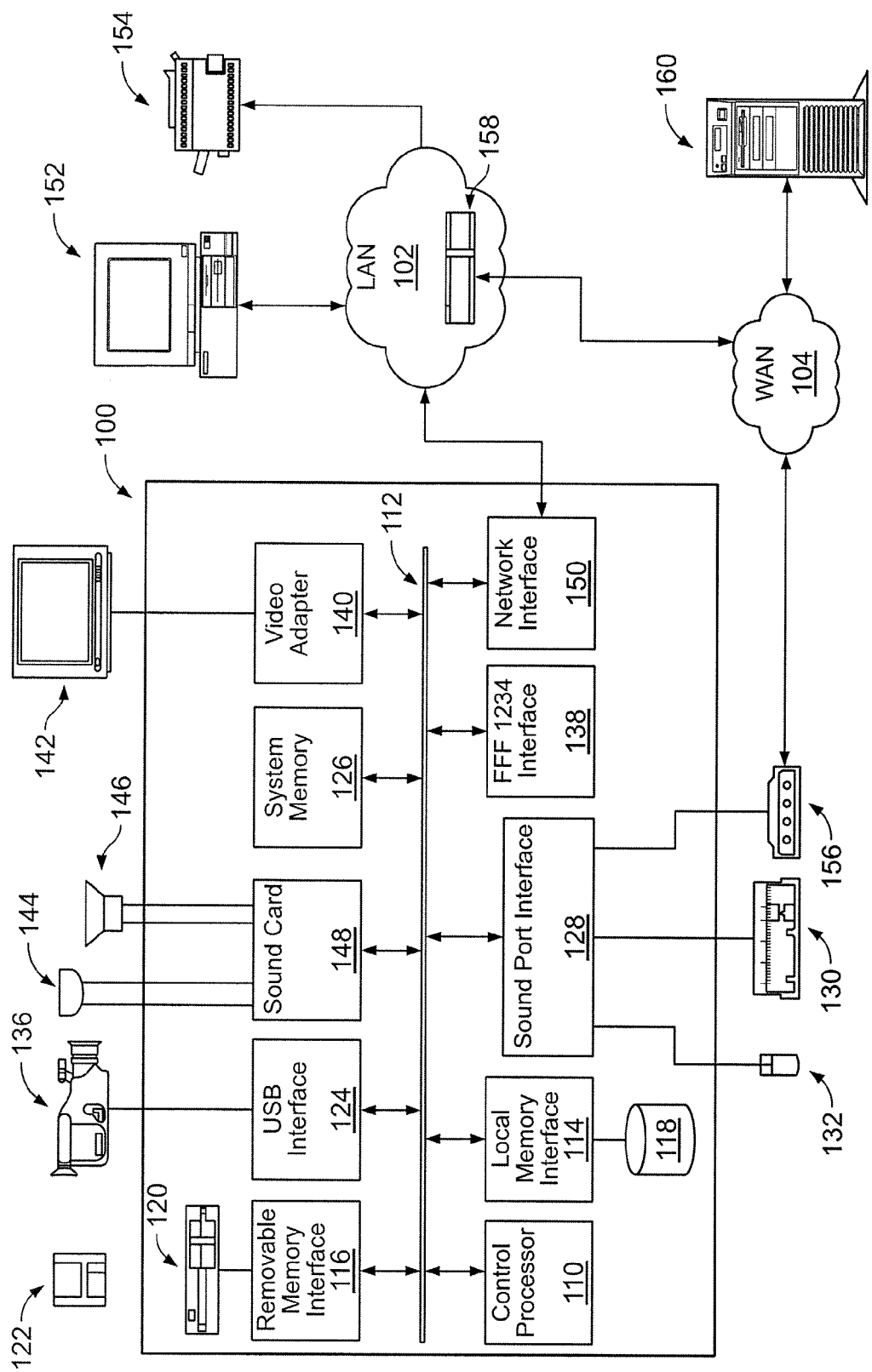
FIG. 1 shows a workstation and communication connections for implementing the present invention.

In order to provide solutions that enable entities to discover, extend, validate and efficiently establish new business relationships over a network, the present invention is preferably implemented in conjunction with one or more computers and one or more networks. An exemplary operating environment for such a computer is illustrated in FIG. 1, in which the computer 100 is connected to a local area network (LAN) 102 and a wide area network (WAN) 104. Computer 100 includes a central processor 110 that controls the overall operation of the computer and a system bus 112 that connects central processor 110 to the components described below. System bus 112 may be implemented with any one of a variety of conventional bus architectures.

Computer 100 can include a variety of interface units and drives for reading and writing data or files. In particular, computer 100 includes a local memory interface 114 and a removable memory interface 116 respectively coupling a hard disk drive 118 and a removable memory drive 120 to system bus 112. Examples of removable memory drives include magnetic disk drives and optical disk drives. Hard disks generally include one or more read/write heads that convert bits to magnetic pulses when writing to a computer-readable medium and magnetic pulses to bits when reading data from the computer readable medium. A single hard disk drive 118 and a single removable memory drive 120 are shown for illustration purposes only and with the understanding that computer 100 may include several of such drives. Furthermore, computer 100 may include drives for interfacing with other types of computer readable media such as magneto-optical drives.

Unlike hard disks, system memories, such as system memory 126, generally read and write data electronically and do not include read/write heads. System memory 126 may be implemented with a conventional system memory having a read only memory section that stores a basic input/output system (BIOS) and a random access memory (RAM) that stores other data and files.

A user can interact with computer 100 with a variety of input devices. FIG. 1 shows a serial port interface 128 coupling a keyboard 130 and a pointing device 132 to system bus 112. Pointing device 132 may be implemented with a hard-wired or wireless mouse, track ball, pen device, or similar device.

Computer 100 may include additional interfaces for connecting peripheral devices to system bus 112. FIG. 1 shows a universal serial bus (USB) interface 134 coupling a video or digital camera 136 to system bus 112. An IEEE 1394 interface 138 may be used to couple additional devices to computer 100. Furthermore, interface 138 may configured to operate with particular manufacture interfaces such as FireWire developed by Apple Computer and i.Link developed by Sony. Peripheral devices may include touch sensitive screens, game pads scanners, printers, and other input and output devices and may be coupled to system bus 112 through parallel ports, game ports, PCI boards or any other interface used to couple peripheral devices to a computer.

Computer 100 also includes a video adapter 140 coupling a display device 142 to system bus 112. Display device 142 may include a cathode ray tube (CRT), liquid crystal display (LCD), field emission display (FED), plasma display or any other device that produces an image that is viewable by the user. Sound can be recorded and reproduced with a microphone 144 and a speaker 146. A sound card 148 may be used to couple microphone 144 and speaker 146 to system bus 112.

One skilled in the art will appreciate that the device connections shown in FIG. 1 are for illustration purposes only and that several of the peripheral devices could be coupled to system bus 112 via alternative interfaces. For example, video camera 136 could be connected to IEEE 1394 interface 138 and pointing device 132 could be connected to USB interface 134.

Computer 100 includes a network interface 150 that couples system bus 112 to LAN 102. LAN 102 may have one or more of the well-known LAN topologies and may use a variety of different protocols, such as Ethernet. Computer 100 may communicate with other computers and devices connected to LAN 102, such as computer 152 and printer 154. Computers and other devices may be connected to LAN 102 via twisted pair wires, coaxial cable, fiber optics or other media. Alternatively, radio waves may be used to connect one or more computers or devices to LAN 102.

A wide area network 104, such as the Internet, can also be accessed by computer 100. FIG. 1 shows a modem unit 156 connected to serial port interface 128 and to WAN 104. Modem unit 156 may be located within or external to computer 100 and may be any type of conventional modem, such as a cable modem or a satellite modem. LAN 102 may also be used to connect to WAN 104. FIG. 1 shows a router 158 that may connect LAN 102 to WAN 104 in a conventional manner. A server 160 is shown connected to WAN 104. Of course, numerous additional servers, computers, handheld devices, personal digital assistants, telephones and other devices may also be connected to WAN 104.

Figure 2:
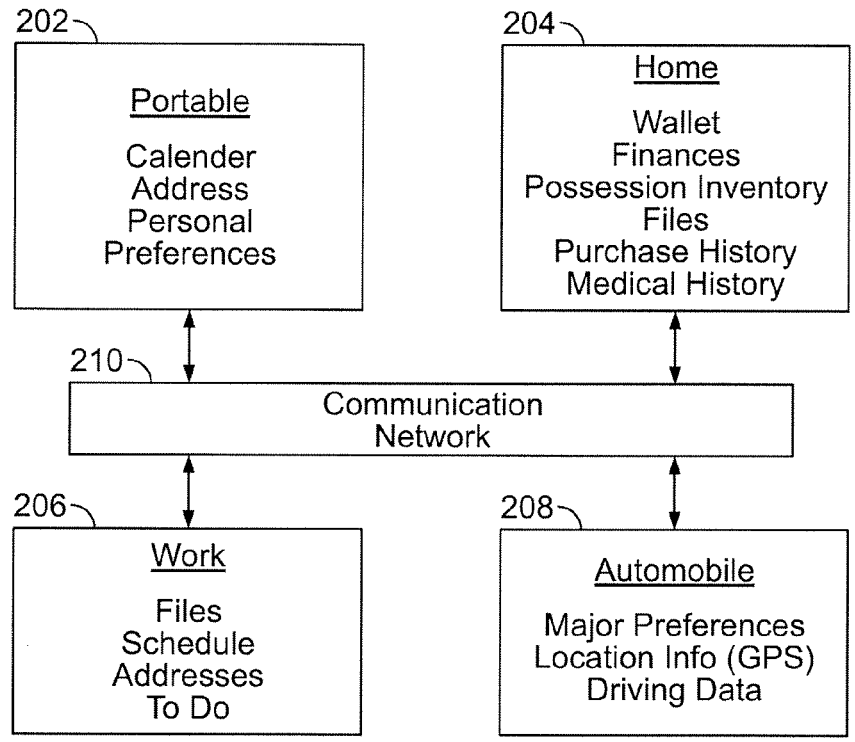
FIG. 2 is a block diagram illustrating an exemplary content network corresponding to an individual in accordance with the prior art.
Figure 3:
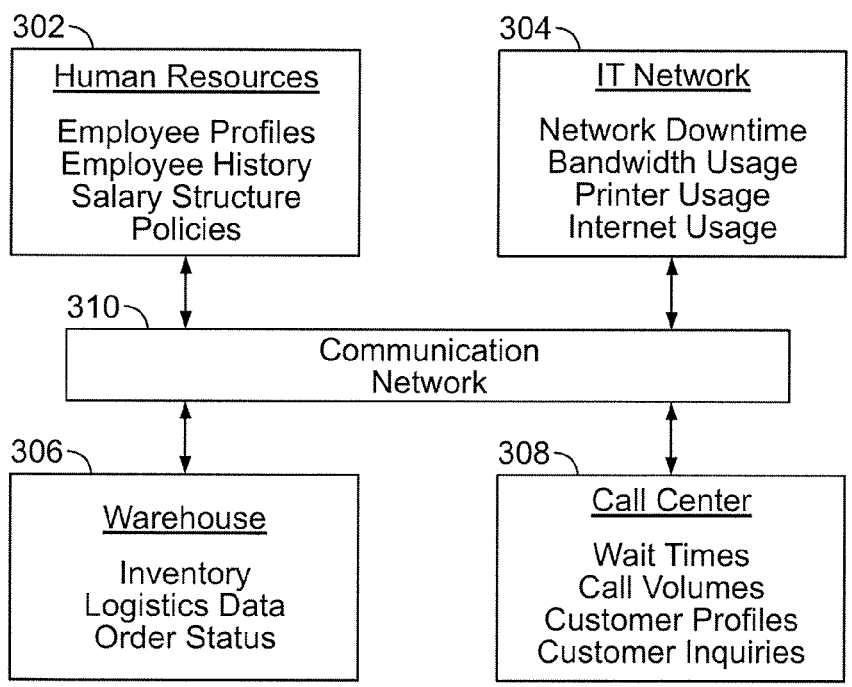
FIG. 3 is a block diagram illustrating an exemplary content network and corresponding to a corporation in accordance with the prior art.

The operation of computer 100 and server 160 can be controlled by computer-executable instructions stored on a computer-readable medium. For example, computer 100 may include computer-executable instructions for transmitting information to server 160, receiving information from server 160 and displaying the received information on display device 142. Furthermore, server 160 may include computer-executable instructions for transmitting hypertext markup language (HTML) or extensible markup language (XML) computer code to computer 100. 136 As noted above, the term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" 102, 104, but also a "content network," which is comprised of the data—attributable to a single entity—which resides across all physical networks. Examples of this are shown in FIGS. 2–3 and briefly discussed below. Content networks are also discussed in detail in related U.S. application Ser. No. 09/817,917.

As depicted in FIG. 2, an individual may have different data stored in their portable network 202 (e.g., a personal digital assistant), a home network 204 (e.g., a desktop computer), a work network 206 (e.g., a laptop computer) and an automobile network 208 (e.g., an on-board computer). FIG. 3 depicts a similar example in a corporate context. The corporate entity may have different data stored in a human resources network 302, an information technology network 304, a warehouse network 306 and a call center network 308. Of course, other physical networks may be readily incorporated or substituted into the examples of FIGS. 2–3. Each of these networks 202–208, 302–308 may be coupled to a communication network 210, 310 such as a LAN 102 or WAN 104, so that the data contained in the networks 202–208, 302–308 is commonly available to the individual. Accordingly, all of the pertinent data attributable to a single entity is part of the network (i.e., content network), regardless of the physical network on which the data resides.

Thus, by implementing the present invention in conjunction with a computer and network like any of those discussed above and/or illustrated in FIGS. 1–3, the present invention overcomes the limitations and problems of the prior art by enabling entities to discover, extend, validate and efficiently establish new business relationships.

Figure 4A:
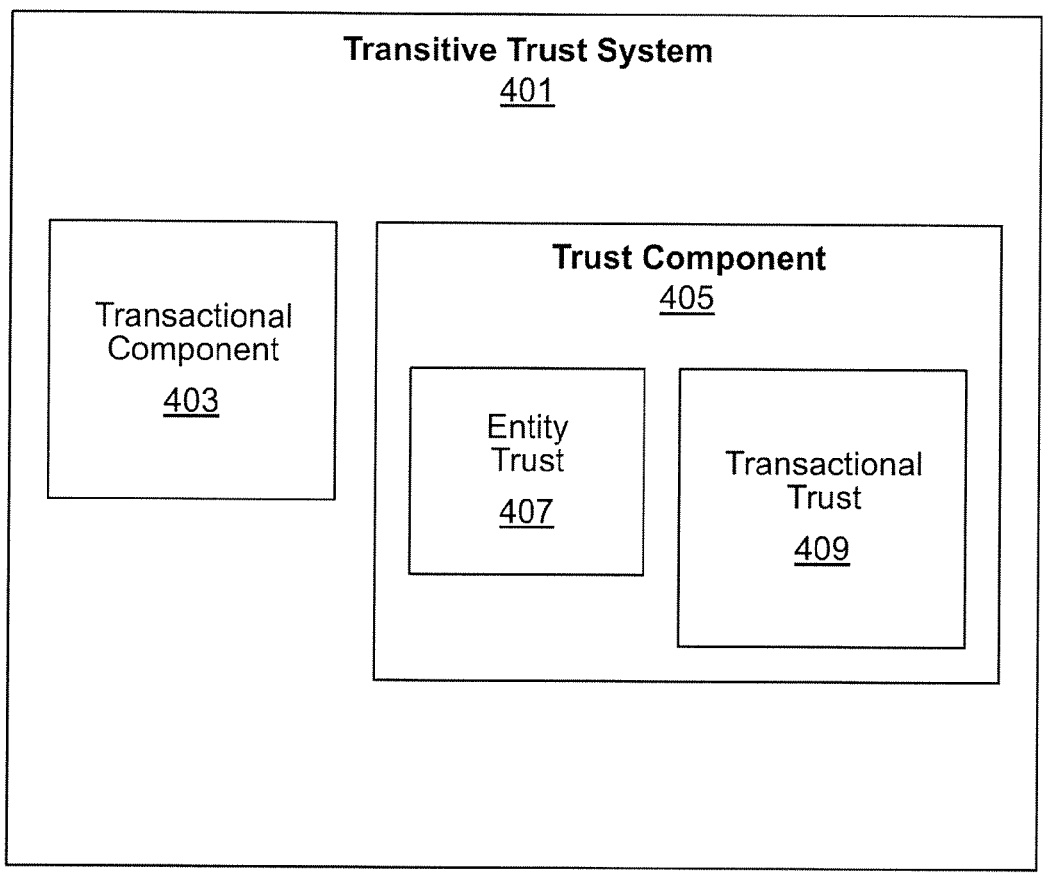
FIG. 4a depicts a block diagram of an exemplary transitive trust system and potential components thereof.

In particular, the present invention provides this solution and these advantages by preferably utilizing a transitive trust system 401 like the one shown in FIG. 4a, which includes two or more components such as, for example, a transactional component 403 and a trust component 405. Transactional component 403 provides a peer-to-peer type capability for sharing information regarding entities. Trust component 405 can store trust-related information such as: valuation criteria for judging relationships, trust levels between all entities that are involved in a particular project, proxy capabilities, and/or trust parameters that may exist between entities.

More particularly, the valuation criteria of the trust-related information may be defined by the entities and may include factors such as performance or activity of an entity in the past, size of order, monetary limits put in place, numbers of mishandled orders, etc. The trust levels can identify the potentially varying levels of trust between entities in the project. For example, Entity A might have a high level of trust for Entity B, but a lower level of trust for Entity C. This information could be captured in the trust levels. Proxy capabilities identify who can do what on behalf of an entity. Lastly, the trust parameters provide the ability to classify the nature of a business relationship and the level to which an enterprise is confident in sharing information. Information can, of course, vary from the number and type of items to be purchased to, for example, strategic plans on entering a new market with a new product.

The trust component 405 of the transitive trust system 401 can include two or more portions such as, for example, a portion directed to entity trust portion 407 and a portion directed to transactional trust portion 409. Entity trust portion 407 is preferably a list or other data structure that stores the distinguishing characteristics of those companies with which one has or desires to have a business relationship (i.e., an entity trust list). The entity trust can define or describe the dependability, reliability and/or credibility of the entities included in the list or data structure.

Exemplary types of characteristics that can be incorporated into the entity trust portion 407 include, but are not limited to: names of known entities and corresponding information such as digital certificates, e-mail addresses, Hoover's reports, web site addresses, LDAP (Lightweight Directory Access Protocol), directory pointers, etc.; a listing of some or all previous transactions between a host and other trusted users, such as date/time stamps, who originated the transaction, how the transaction was executed, etc.; a listing of the "content" of historical transactions; a subjective or objective quality rating for historical transactions; an overall rating of another trusted user that can be used as a response to queries from other trusted users; and/or a mapping of "who knows who" and tracking of how relationships were established, and how the relationships can be extended.

Transactional trust portion 409 is preferably a list or data structure that stores the parameters that define business exchanges within a particular industry segment. Transactional trust portion 409 can include information about the types of transactional activities that can take place and proxy actions available to cooperating entities. Further, transactional trust portion 409 can capture criteria related to conducting a single business transaction. These criteria can preferably be divided between proxy and activity-trust parameters, and may be included in one or more transactional trusts (e.g., transactional trust lists).

Of these criteria, proxy trust parameters can be used to indicate or determine whether or not a party can forward requests to other trusted parties. Exemplary proxy trust parameters may include, but are not limited to: can this party forward requests to other trusted parties (propagating requests through multiple degrees of separation); can this party add new trusted users (once a party's entity trust information is discovered in the network, does a trusted user have the right to update the requestor's records); can this party communicate "entity opinions" through the network (beyond creating new records, does a trusted party have the ability to pass along the trust ratings or subjective opinions of the network back to the original requestor); and other activities a trusted entity can perform on behalf of the trusting party including dynamically created proxy parameters that are specified by any two cooperating parties within a transitive trust network.

The activity-trust parameters can be used to quantify the level or nature of the business relationship. By categorizing the nature of the business relationship, an entity can better judge the level of trust in the relationship and/or put other trust measures in context. For example, in a close business relationship a manufacturer and distributors may share information regarding planning and forecasting for inventory movements, but may not share information pertaining to product development. Activity trust parameters include, but are not limited to the following: type of transaction a particular entity can handle, such as purchasing, outsourcing, sub-contracting, etc.; activity trust levels; and performance or activity of a partner in the past, such as size of order, monetary limits put in place, numbers of mishandled orders, etc.

Figure 4B:
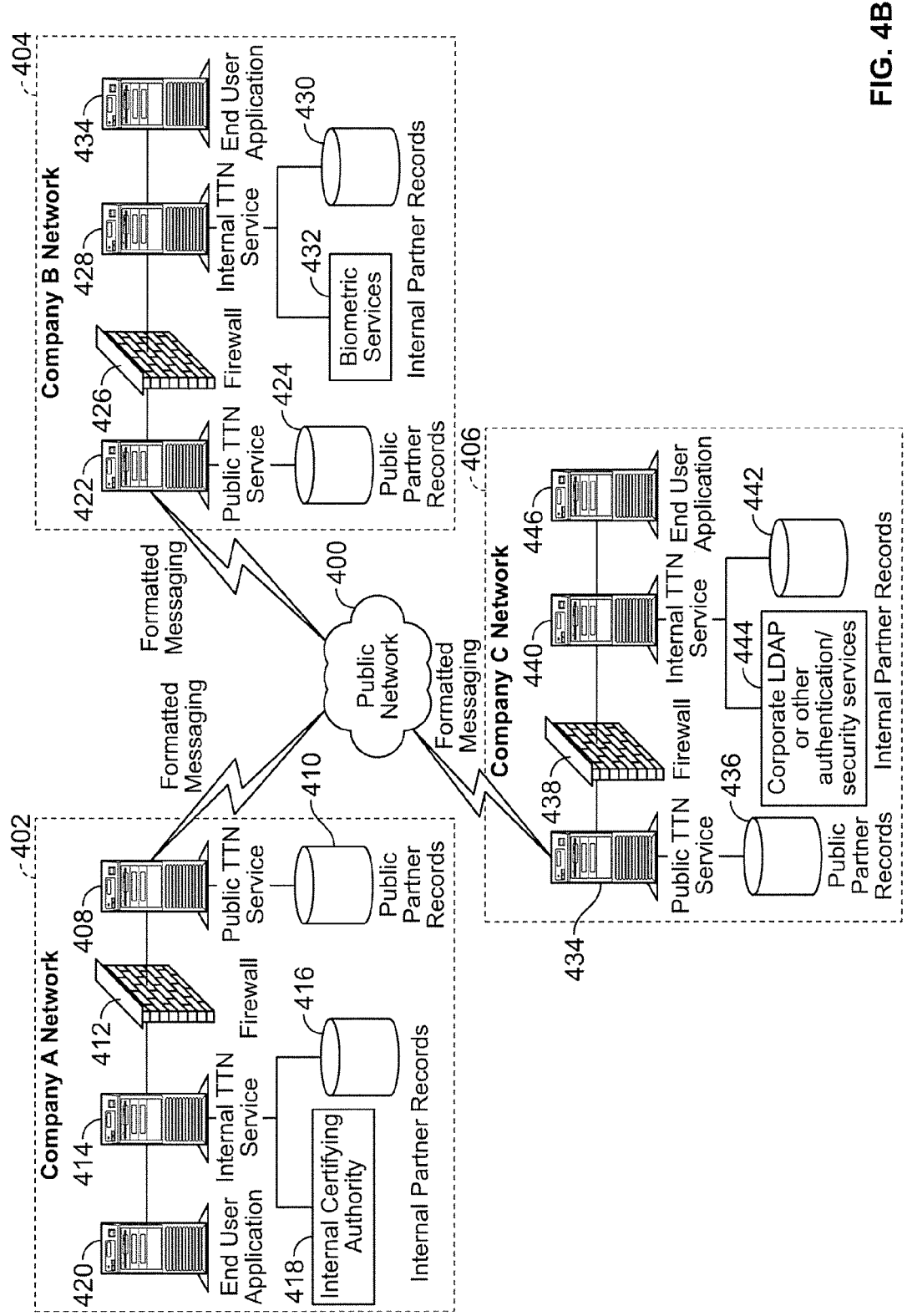
FIG. 4b is a diagram depicting an embodiment of the present invention.

FIG. 4b shows an inter-company transitive trust diagram depicting three company networks (company A network 402, company B network 404, and company C network 406). The three company networks 402, 404 and 406 are interconnected by public network 400 such as a wide area network or the Internet. Public network 400 allows formatted messaging to be exchanged between the three company networks 402, 404 and 406. One implementation of such is a network that uses the Universal Description, Discovery and Integration (UDDI) specification, which creates a global, platform-independent, open framework to enable businesses to discover each other, define how they interact over the Internet, and share information in a global registry that will more rapidly accelerate the global adoption of B2B E-commerce. UDDI is a cross-industry effort driven by platform providers, software developers, marketplace operators, and E-commerce and business leaders that comprehensively allows growth of B2B E-commerce, and that benefits businesses by creating this global, platform-independent, open framework. The UDDI specifications take advantage of World Wide Web Consortium (W3C) and Internet Engineering Task Force (IETF) standards such as Extensible Markup Language (XML), HTTP, and Domain Name System (DNS) protocols. Additionally, cross platform programming features are addressed by adopting early versions of the proposed Simple Object Access Protocol (SOAP) messaging specifications found at the W3C Web site.

As shown by example in FIG. 4b, components in each of the company networks have various configurations. For example, the company A network 402 is interconnected to the public network 400 by a public transitive trust network service unit 408 which is connected in turn to a storage element 410 that has public partner records. The public transitive trust network service 408 is connected via a firewall 412 to an internal transitive trust network service unit 414. This unit 414 is connected to a data storage device 416, which contains internal partner records, and to an internal certifying authority 418. The internal transitive trust network service unit 414 is also connected to a terminal 420, which has end user applications.

The company B network 404 has a public transitive trust network service unit 422 that is connected to the public network 400 and to a data storage device 424, which contains public partner records. The unit 422 is also connected via a firewall 426 to an internal transitive trust network service unit 428. This unit 428 is connected to a data storage device 430, which contains internal partner records, and also to a biometric services unit 432. The unit 428 is also connected to a terminal 434, which contains end-user applications.

The company C network 406 is also connected to the public network 400 by a public transitive trust network service unit 434, which is connected to a data storage device 436 containing public partner records. A firewall 438 connects the public transitive trust network service unit 434 to an internal transitive trust network service unit 440. The unit 440 is connected to a data storage device 442, which contains internal partner records, and to a corporate LDAP (Lightweight Directory Access Protocol) or other authentication/security service unit 444. The unit 440 is also connected to a terminal 446, which has end-user applications.

Figure 5:
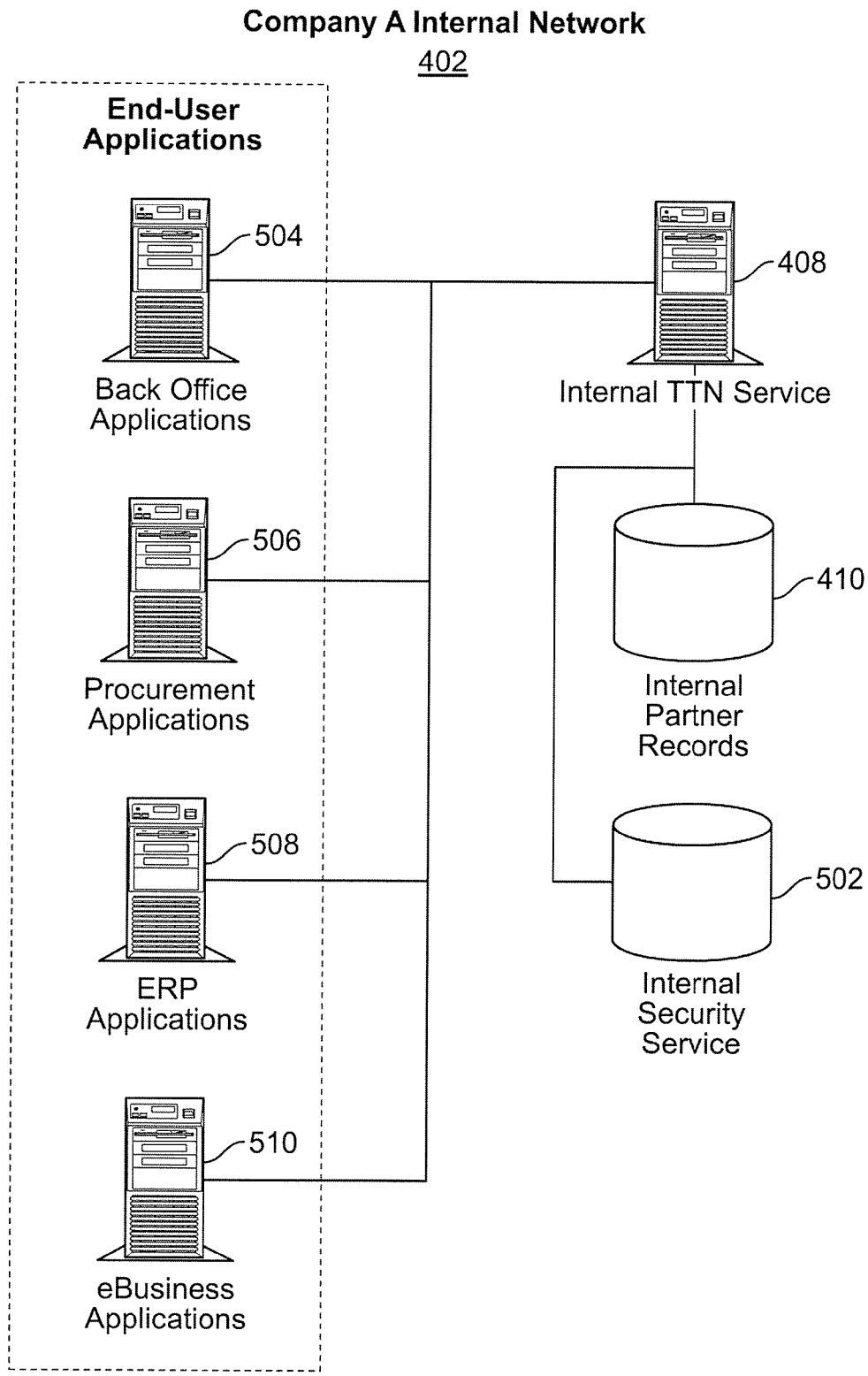
FIG. 5 is a diagram depicting a portion of the embodiment of FIG. 4b.

FIG. 5 depicts in more detail internal network 402 of company A. The internal transitive trust network service unit 408 is connected to the data storage device 410, which contains internal partner records, and further to a data storage device 502, which has internal security service applications. The internal transitive trust network service unit 408 is connected to a plurality of end user applications depicted as terminals 504, 506, 508 and 510. The terminal 504 contains back office applications, the terminal 506 contains procurement applications, the terminal 508 contains enterprise resource planning ("ERP") applications, and the terminal 510 contains E-business applications. This is only one example and is to be understood that numerous other applications may be utilized depending upon the environment in which the present invention is used.

Figure 6:
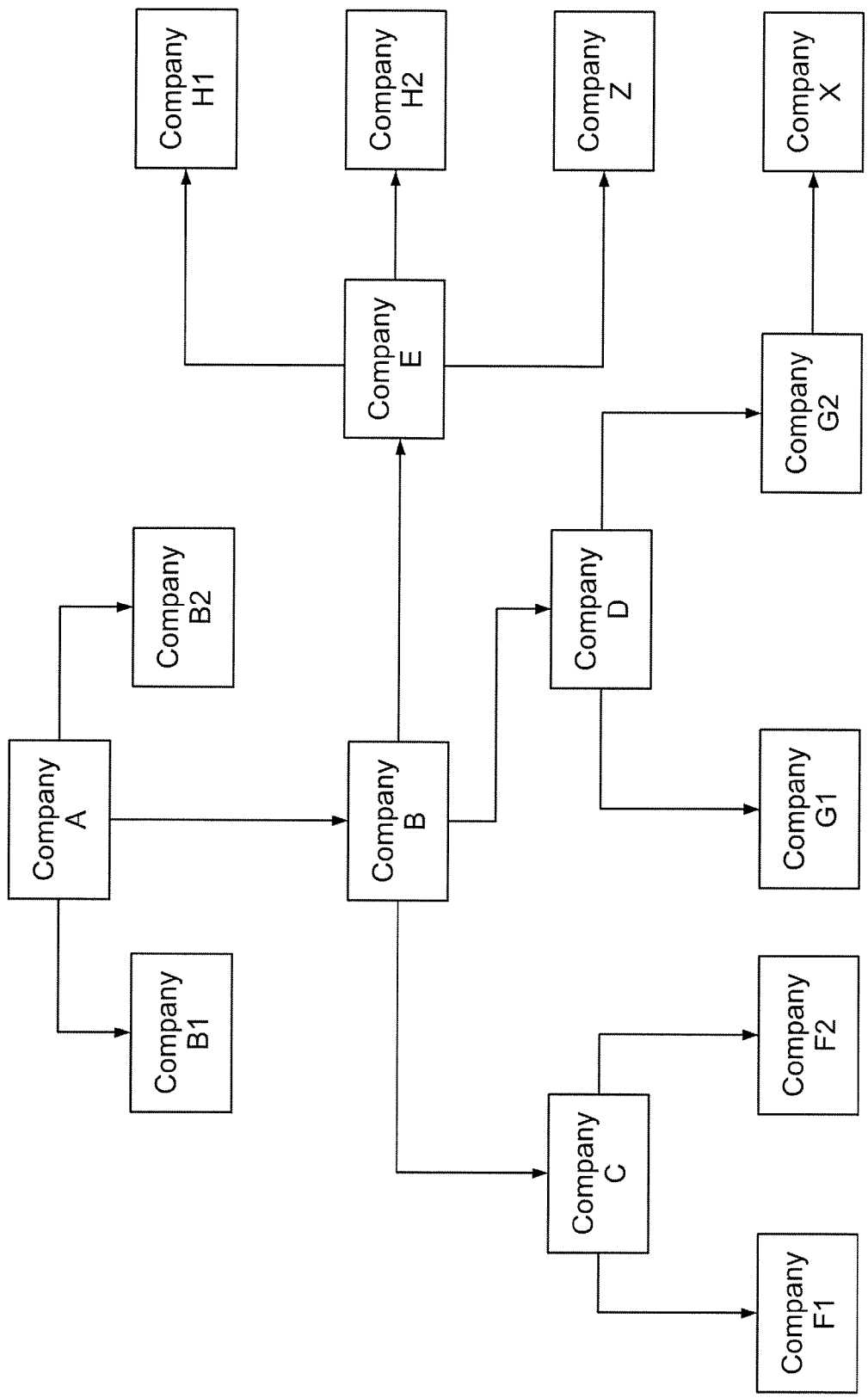
FIG. 6 is a block diagram that is an example of degrees of separation in the present invention.

In a typical business environment companies know and trust certain other companies and, of course, there are a large number of companies, which are unknown at any given point in time. Furthermore, in the business world one company may not trust another company for any type of business transaction, or it may have very high level of trust in another company. FIG. 6 depicts one example of a business community in which company A knows and has a business relationship with companies B, B1 and B2. Company B for example knows and has business relationships with companies C, D and E. Company C knows and has business relationships with companies F1 and F2, company D knows and has business relationships with companies G1 and G2, company E knows and has business relationships with companies H1, H2, and Z, and company G2 knows and has business relationships with company X. There are no degrees of separation between companies A and companies B, B2 and B3. However, there is one degree of separation between company A and companies C, D and E. There are two degrees of separation between company A and companies F1, F2, G1, G2, H1 and H2. There are three degrees of separation between company A and company X. According to the present invention, company A is able to establish a business relationship at a specified trust level with a company such as a company Z, which A does not know and which is separated in the present example by two degrees of separation. Company A is also termed a seeking entity, company Z is also termed a sought entity, and the other companies are also termed intermediate entities.

In one implementation pertaining to an ongoing business setting, each company has a partnership record, which defines its activity and level of trust with another respective business partner. FIG. 7 shows one example of a partnership record 700, which has an active trust domain 702 and capability domain 704. In this example there are four activity-trust levels that a company assigns to other companies: a level one (706) in which a company essentially has little or no trust in the other company in a business sense, a level two (708) which is referred to as a commodity associate trust level, a level three (710) which is referred to a competitive advantage trust level, and a highest trust—level four (712)—which is referred to as a strategic trust level. In short, the levels 706–712 identify the closeness of the trust relationship.

The capability domain 704 can be divided into one or more functions or roles that companies fulfill in business transactions between one another. Preferably, the functions or roles are defined by the nature in which the two entities interact. These functions or roles can include, but are not limited to: design 714, source 716, plan 718, buy 720, make 722, sell 724, fulfill 726 and service 728.

In FIG. 7, various roles or functions that a particular company might fulfill are depicted for each of the elements 714–728 of the capability domain 704 and for each of the trust levels 706–712 in the active trust domain 702. Thus, using the partnership record, for example referring again to FIG. 6, company A is able to classify the roles that each of the companies B, B-2 and B-3 will fulfill along with a transitive trust level for each of theses companies. Each of the companies in the transitive trust network of the present invention has a database for storing the information as depicted in FIG. 7, for example, with regards to its business relationships with other companies.

Within each of these capability domains 714–728, it is possible to classify the level at which information is shared to any one partner in the capability function. Thus, an enterprise can break down its partners within a capability function into one of the trust levels 706–712. In this example of the present invention, depicted in FIG. 7, four levels of activity trust or process levels 706–712 are defined for any one of the eight capability domains 714–728. As noted above, the labels given to these four levels 706–712 of activity trust 702, in order of one to four, correspond to deeper levels of trust afforded to a partner.

For any activity trust level 706–712 in a specific capability domain 714–728, a typical business process is associated therewith. That is, a specific business process is defined at the intersection of each activity trust level label 706–712 with each role in the capability domain 714–728 as illustrated in FIG. 7. That is, for any business function, there are often four different levels of processes, which can be placed in order of the level of trust that one associates with that partner. As an example, "design" 714 in the capability domain 704 and "strategic" 712 in the active trust domain 702, could correspond to the business process of "collaborative access to systems" 730.

Exemplary characteristics of each of the four activity trust level labels 706–712 used in the above example help to clarify the level of relationship afforded an entity when looking at that entity's function. For example, in level one 706, there is either no Trust or "Street" level Trust. This could indicate that the entity is: a known business entity, but not necessarily a past business acquaintance; willing to extend standard terms of credit; willing to send purchase orders. This designation could also mean that there is no validation existing for this entity's performance or reliability.

Level two is termed "Associate" 708 and could, as an example, have the following characteristics: the company has done business in the past; the company is known to be reputable and has met the needs of a close partner; the company is willing to extend credit; and the company is allowed to perform certain functions, such as Vendor Managed Inventory ("VMI").

Level three is termed "Competitive Advantage" 710 and could, for example, have the following characteristics: long term relationship; share planning and forecasting information; consulting with the company regarding company direction and plans; and sharing of files and some access to systems.

Finally, level four is termed "Strategic" 712 and could, for example, have the following characteristics: integration between systems; access to one another's systems; and include/participate in strategic planning and forecasting.

In many cases, the determination of an activity trust level 706–712 for a particular entity is a subjective judgment. A given entity may fill one of a few functions 714–728 in a given capability domain 704 and operate at different levels 706–712 for each function. A determination could be made or rule applied (for example, at least common denominator in level of trust afforded) with regards to the given entity. The length of time since any activity is performed with an entity may also be a factor. A competitive-advantage entity that has not transacted business with the partner in question within the last year could, for example, be automatically re-classified as having an "Associate" level 708 of activity trust. This is because over time many alliance or marketplace changes may have taken place, and it is necessary to reevaluate the relationship before a high level of trust is again afforded.

In part because the determination of an activity trust level for a particular entity is a subjective judgment, any error in assigning activity trust levels may be magnified as the degrees of separation increase. As a result, a seeking company may want to limit the number of degrees of separation between itself and a sought entity when seeking transitive trust levels. In one embodiment of the invention, rules may be established for associating a maximum number of degrees of separation with trust levels. For example, when seeking a company having an activity trust level of "strategic," a seeking company may limit the search to 1 or 2 degrees of separation and allow greater degrees of separation for lower activity trust levels.

A seeking company may be linked to a sought company by more than one path. In this case, the seeking company may choose to rely on the activity trust level associated with the path having the fewest degrees of separation. Alternatively, the seeking company may consider other factors, such as the activity trust levels assigned to the intermediate companies. For example, the seeking party may give more weight to an activity trust level associated with a path having more degrees of separation when the intermediate companies in that path have higher activity trust levels. Of course, there are a number of different ways that a seeking party can weigh, average or otherwise consider activity trust levels obtained from more than 1 path.

Figure 8:
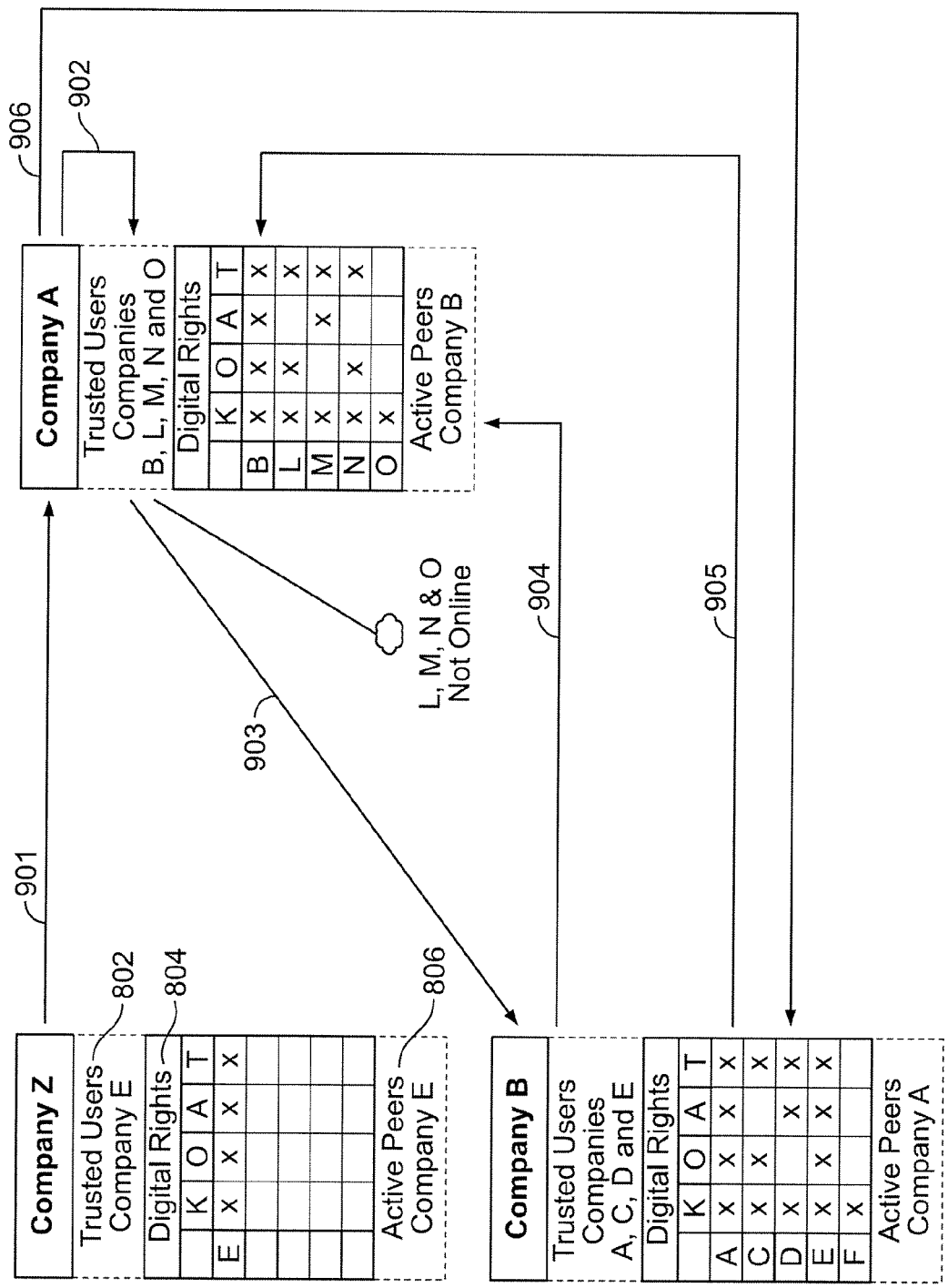
FIGS. 8–13 illustrate a method according to an embodiment of the present invention.
Figure 9:
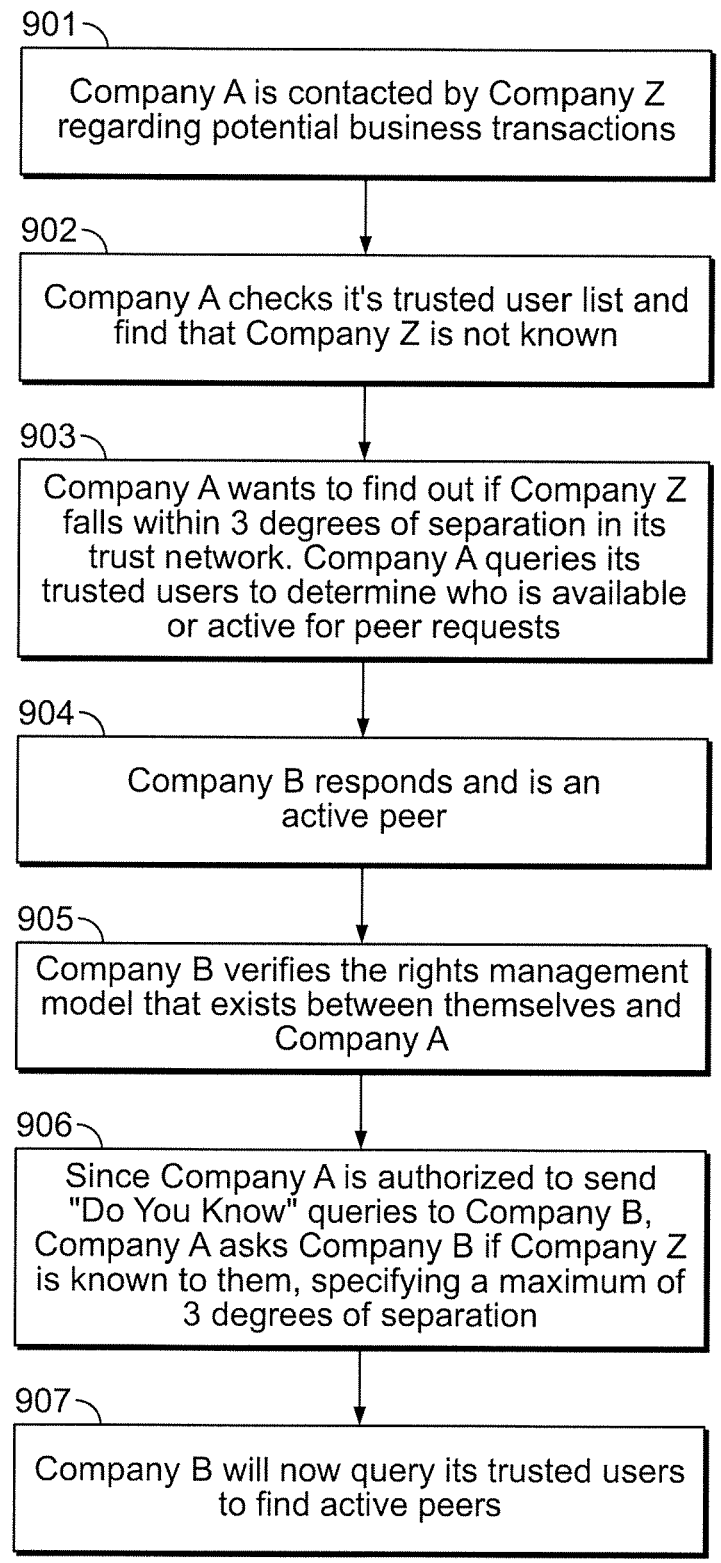

As is well known in the business community, a company from time to time needs to find a new company to fulfill a particular role. It is important of course that the new company can be trusted to fulfill that rule. FIG. 8 depicts an example of the method of the present invention and FIG. 9 is a flowchart depicting the steps corresponding to FIG. 8. As depicted in FIG. 8, company Z (and all other companies in the transitive trust network) has a list 802 of trusted users, a database 804 of digital rights (that is, the partnership record) for each of the trusted users in the list 802, and a list 806 of active peers (that is for example, companies which are currently online with the present company). In a first step 901, company A is contacted by company Z regarding potential business transactions. In a second step 902, company A checks its trusted user list and finds that company Z is not contained therein. That is, company Z is not known to company A. The companies contained in the trusted users list for company A are companies B, L, M, N and O. At this point in time, companies L, M, N an O are not online and thus the only active peer is company B. In a step 903, company A wants to find out if company Z falls within three degrees of separation in its trust network. Company A then queries its trusted users (company B) to determine who is available or active for peer requests. In step 904, company B responds and is an active peer. In step 905, company B verifies a rights management model that exists between itself and company A. A rights management model is a set of rules or rights used to determine the type of information that may be exchanged between companies. It is now been determined that company A is authorized to send "do you know" queries to company B. In step 906, company A asks company B if company Z is known to it, specifying a maximum of three degrees of separation. In step 907, company B will query its trusted users to find active peers.

Figure 10:
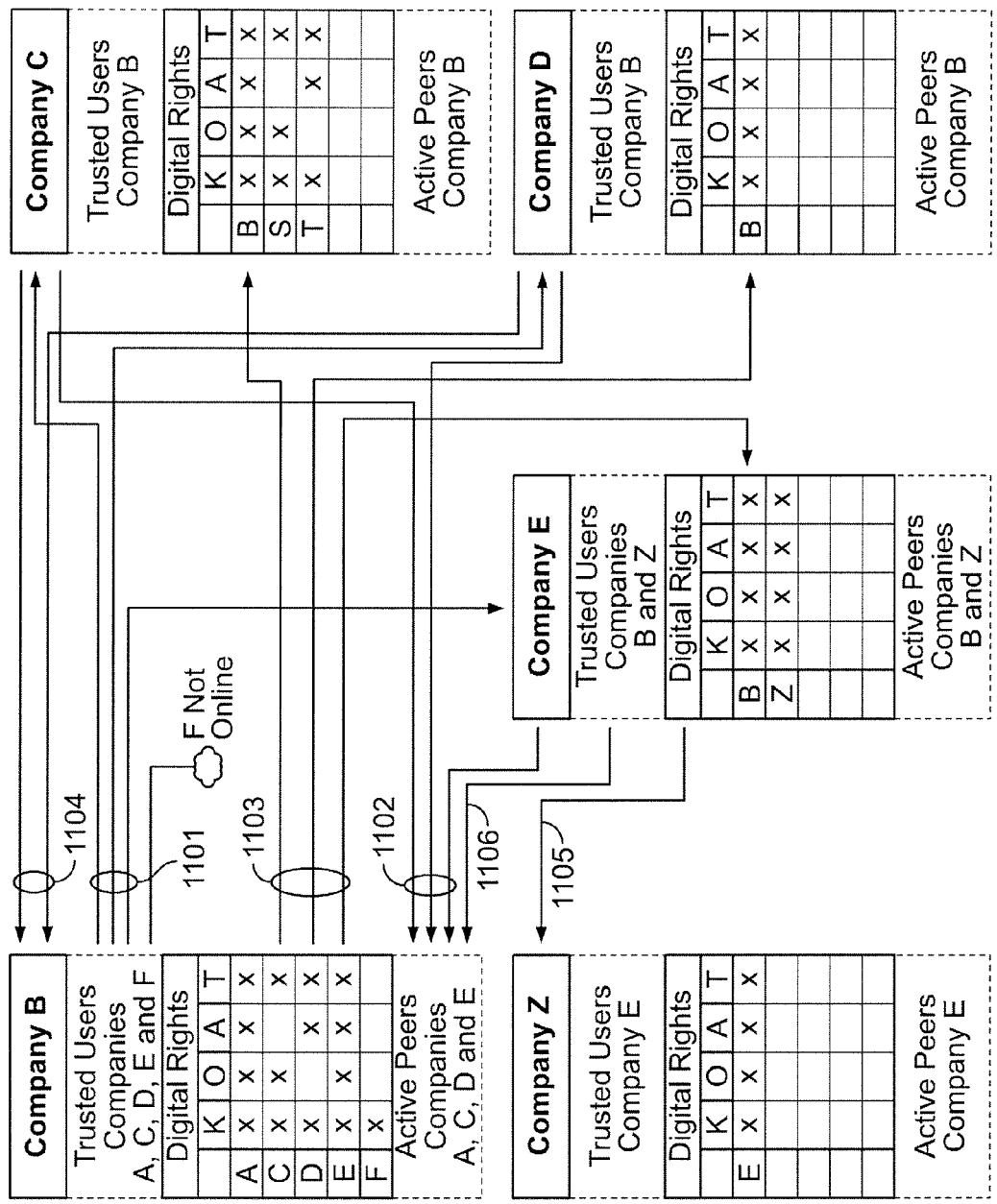
Figure 11:
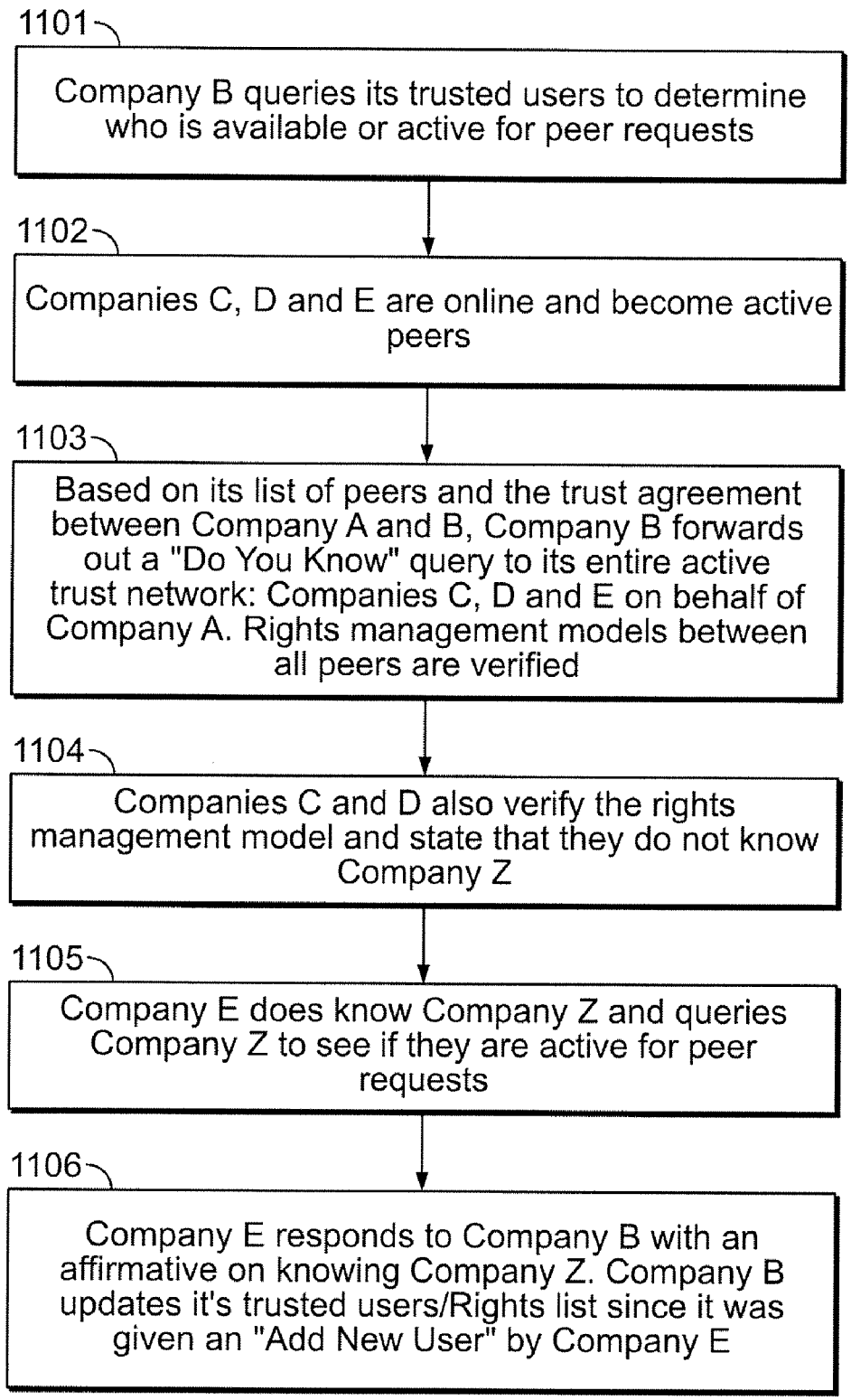

The interaction between the companies is further depicted in FIG. 10 and in the corresponding flowchart of FIG. 11. In step 1101 company B queries its trusted users to determine who is available or active for peer requests. Of its trusted users, company F is not online, but companies C, D and E are online and become active peers (see step 1102). Based on its list of peers and the trust agreement between company A and company B, company B in step 1103 forwards out a "do you know" query to its entire active trust network, that is company C, D and E on behalf of company A. Again, rights management models between all peers are verified using any set of rules or rights that can determine the type of information that may be exchanged between companies. In step 1104 companies C and D also verify the rights management model and state that they do not know company Z. In step 1105 company E, which does know company Z, queries company Z to determine if company Z is active for peer requests. In step 1106 company E responds to company B with an affirmative on knowing company Z. Company B in response thereto updates its trusted users/rights list.

Figure 12:
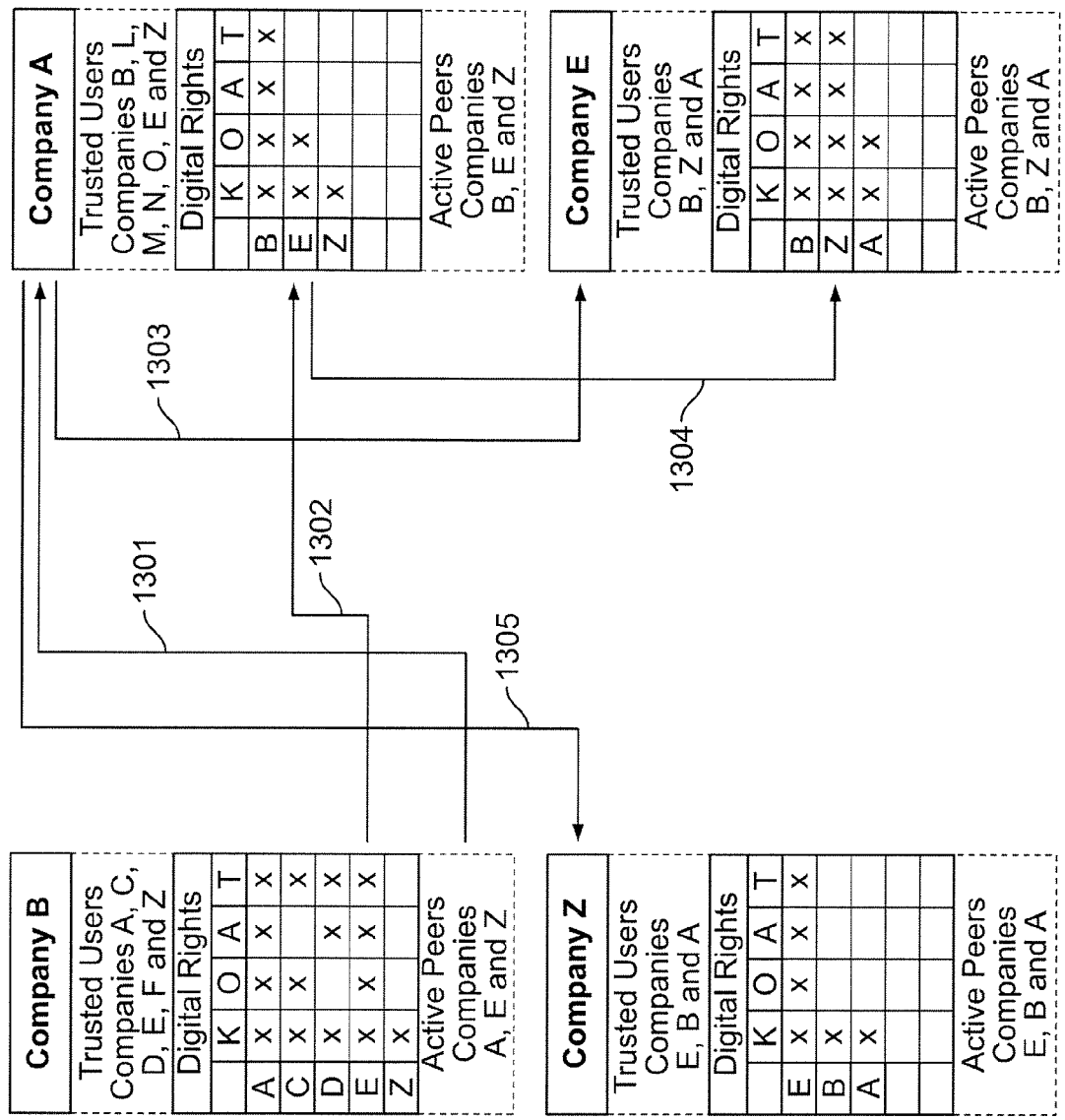
Figure 13:
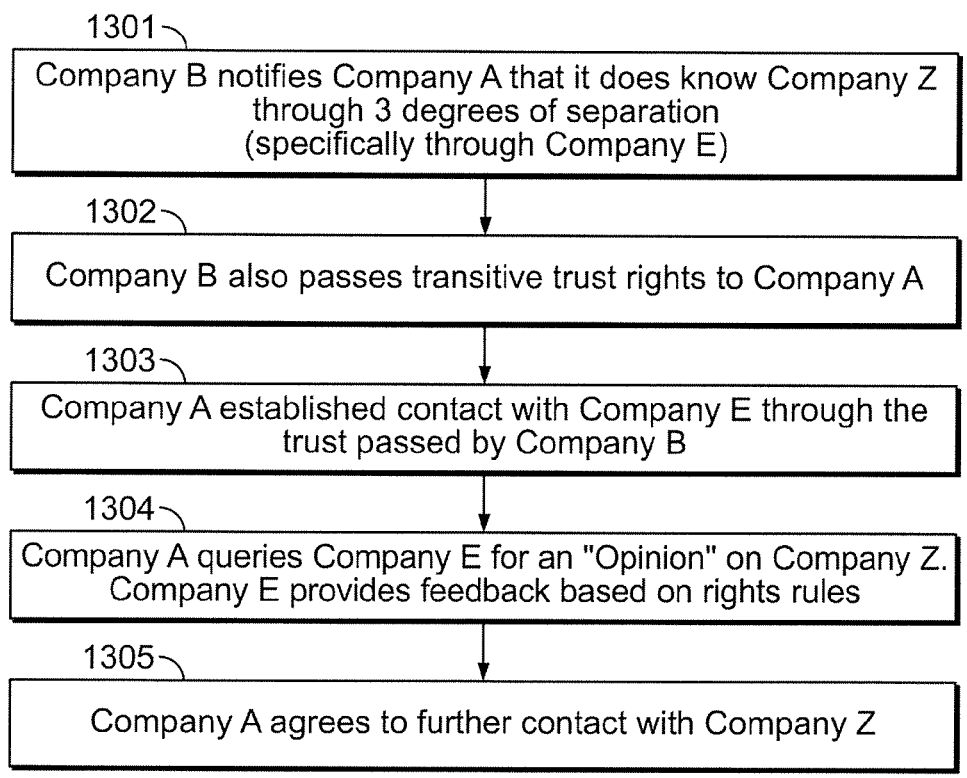

Continuing now with the method as depicted in FIG. 12 and a corresponding flowchart in FIG. 13, company B in step 1301 notifies company A that it does know company Z through three degrees of separation (specifically through company E). In step 1302 company B also passes transitive trust rights to company A that allow company A to receive information from company E. In step 1303 company A establishes contact with company E through the trust passed by company B. In step 1304 company A now queries company E for an "opinion" regarding company Z. Company E then provides feedback based on the rights rules. Finally, in step 1305 company A agrees to further contact with company Z. Company A can now establish a business relationship with company Z with some degree of trust, because company A trusts company B who trusts company E.

Figure 14A:
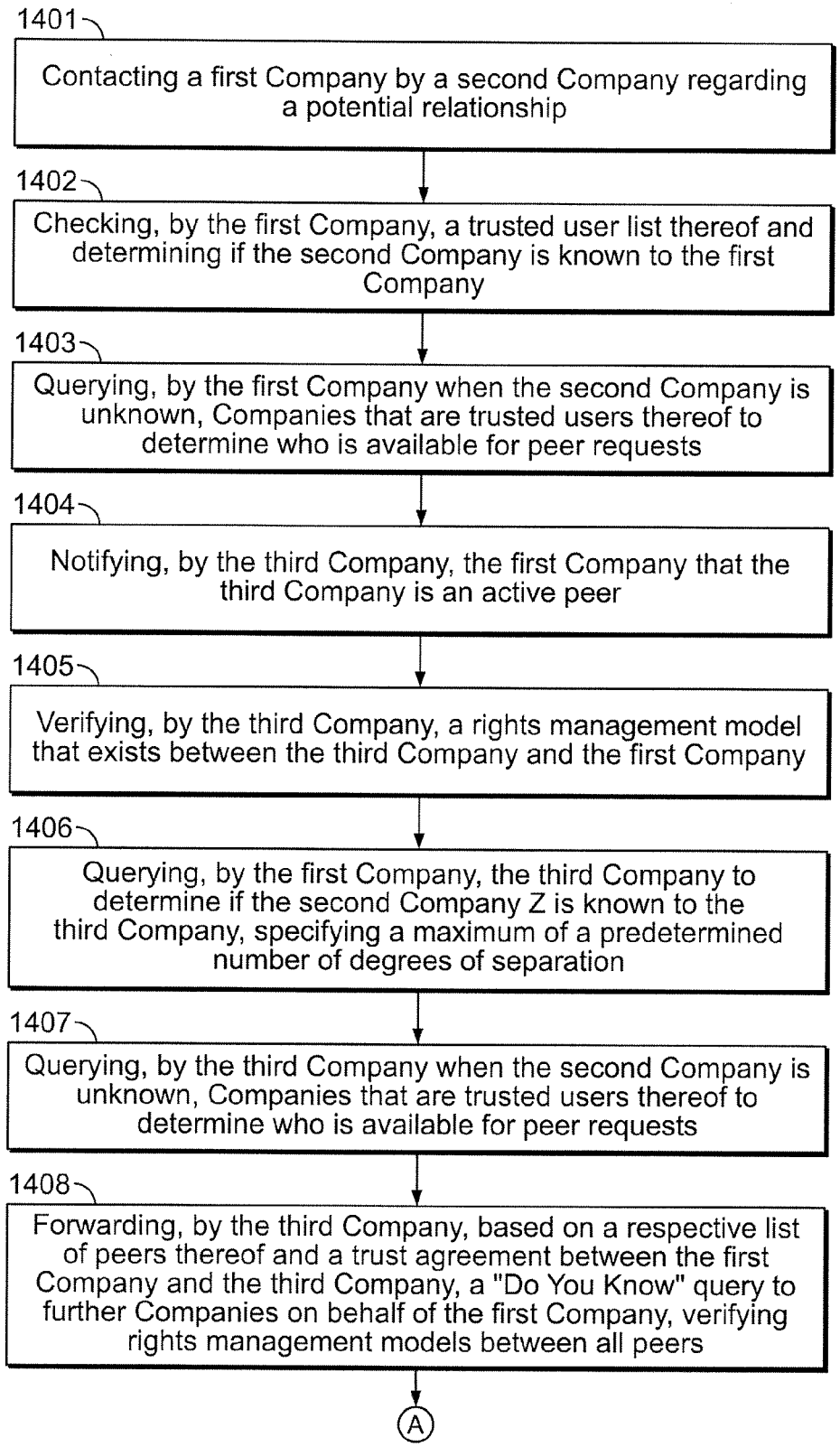
FIGS. 14a and 14b are flowcharts illustrating a method of another embodiment of the present invention.
Figure 14B:
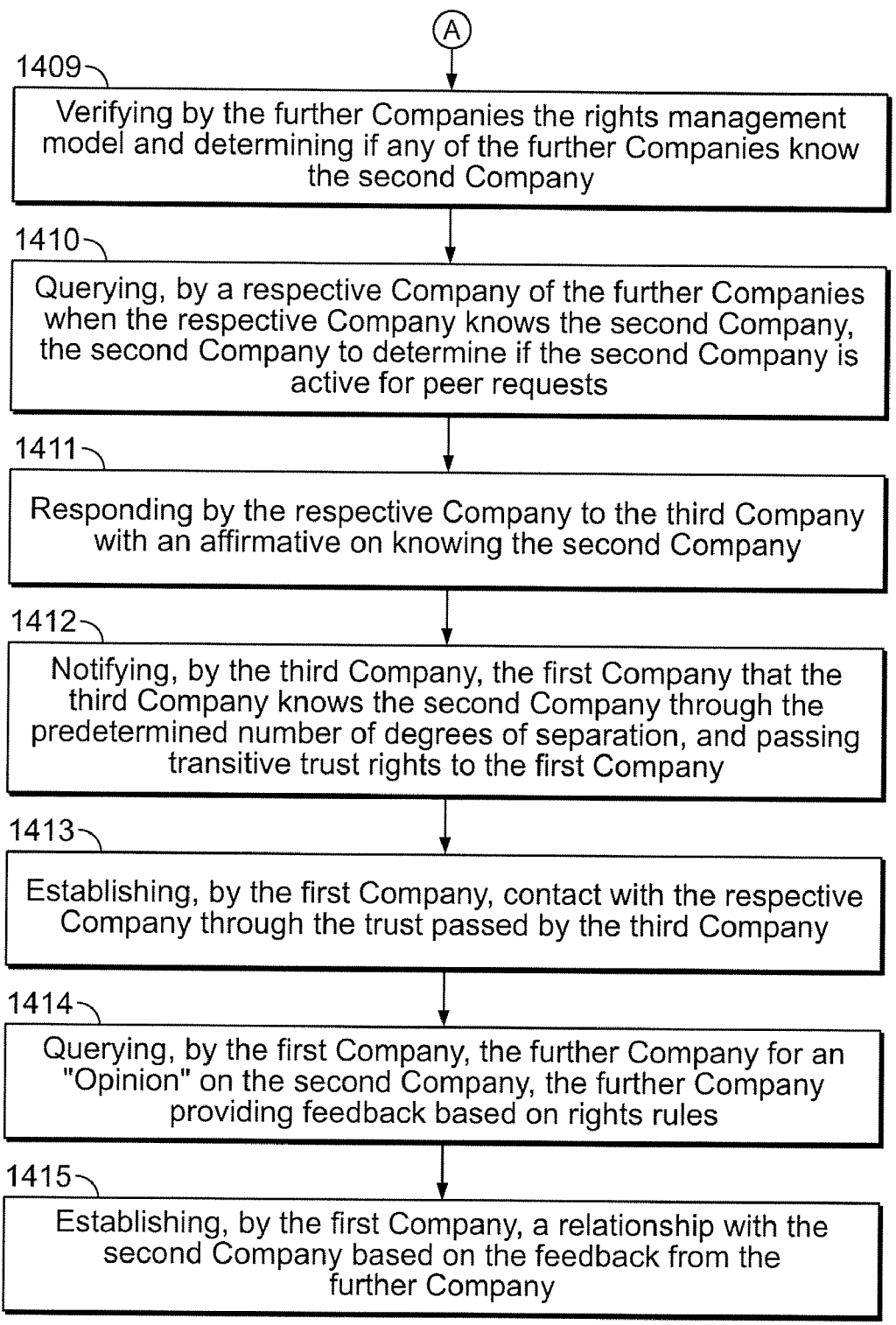

This method may be embodied in a network such as depicted in FIG. 4b. In this network 400 each of the networks, 402, 404, 406, has a computer (such as service unit 408 in network 402) and storage (such as storage element 410 in network 402). In more general terms FIG. 1 also shows a computer 100 that includes a central processor 110 and a system memory (storage) 112. As is known, instructions that are executed by the processor are storable on the storage. FIGS. 14a and 14b depict a flowchart of a further embodiment of a method of the present invention that is executable in computer environments such as depicted in FIGS. 1, 2, 3 and 4b. In step 1401, a first company is contacted by a second company with regards to a potential business transaction (effected by, for example, an inquiry receiving component corresponding to an instruction contained in the storage). This potential transaction may be type of business transaction such as for the sale of goods.

In step 1402, the first company checks its trusted user list and determines if the second company is known to the first company. This step 1402 may include searching a database of known users. In step 1403, the first company queries companies that are trusted users thereof to determine who is available for peer requests (e.g. which companies are online or otherwise available). In step 1404, a third company notifies the first company that the third company is an active peer and is available to communicate with the first company. In step 1405, the third company verifies a rights management model that exists between the third company and the first company in order to determine the types of information that may be exchanged. In step 1406, the first company queries the third company to determine if the second company is known to the third company. The first company also specifies a predetermined number of degrees of separation. For example, the first company may query the third company to determine if the second company is known to the third company through four degrees of separation.

In step 1407, the third company queries the further companies that are trusted users thereof to identify companies that are available for peer requests. In step 1408, a third company forwards, based on a respected list of peers and a trust agreement between the first company and the third company, a "do you know" query to the further companies on behalf of the first company, verifying rights management models between all peers. In step 1409, the further companies verify the rights management model and determine if any of the further companies know the second company. In a step 1410, a respective company of the further companies that the second company is known to, queries the second company to determine if the second company is active for peer requests. In step 1411, a respective company responds to the third company and indicates that it knows the second company. In step 1412, the third company notifies the first company that the third company knows the second company through the pre-determined number of degrees of separation, and passes transitive trust rights to the first company (effected by, for example, a response receiving component corresponding to an instruction contained in the storage). In step 1413, the first company establishes contact with the respective company through the trust passed by the second company. In step 1414, the first company queries the further company for an "opinion" regarding the second company, the further company then providing feedback based on rights rules (effected by, for example, a confirming component corresponding to an instruction contained in the storage). Finally, in step 1415, the first company establishes a relationship with the second company based on the feedback from the further company.

Figure 15:
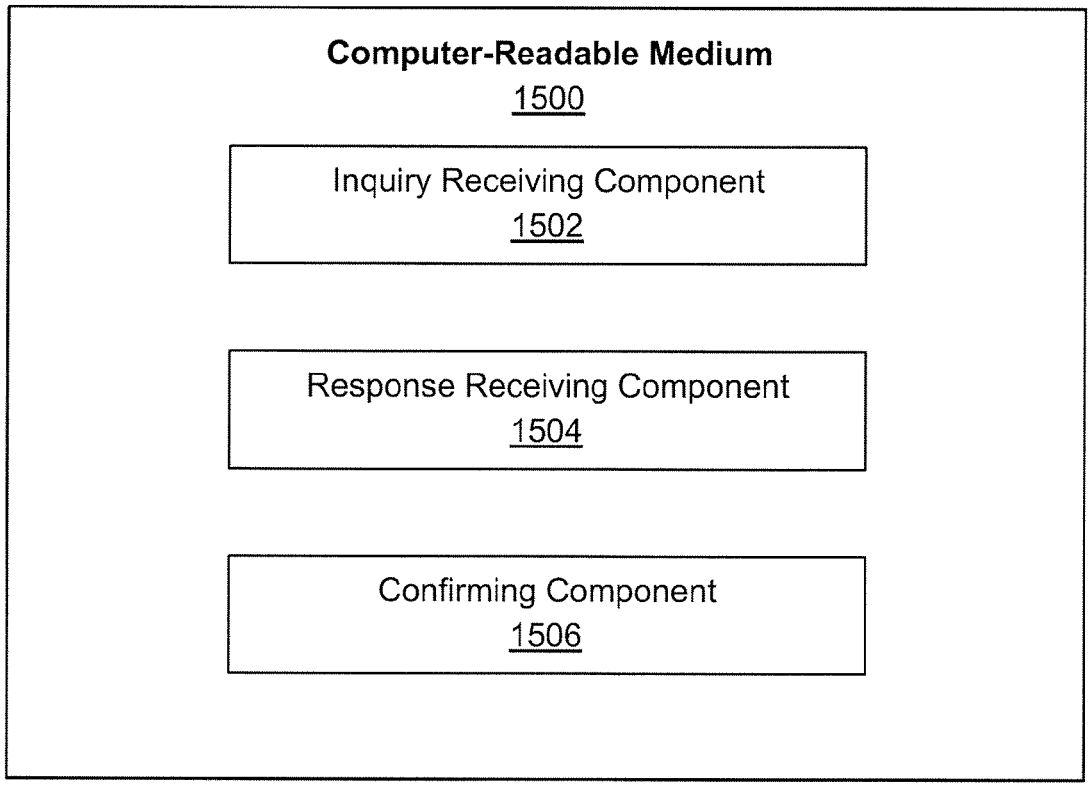
FIG. 15 depicts a computer-readable medium with exemplary computer-executable components or sets of instructions for implementing another embodiment of the present invention.

In other embodiments, the above methods or variations thereof could be implemented by using one or more computer-executable components or sets of instructions as illustrated in FIG. 15. More particularly, one or more computer-readable media 1500 could store computer-executable components or sets of instructions in order to enable entities to discover, extend, validate and/or establish business relationships over a network. In this embodiment, the computer-executable components could include an inquiry receiving component 1502, which could receive inquiries from a seeking entity that wishes to establish a business relationship with a sought entity. The components could also include a response receiving component 1504, which could receive responses from other entities (e.g., an intermediate entity). These responses might, for example, identify whether a relationship exists between the sought entity and the intermediate entity. Moreover, the components might also include a confirming component 1506 for confirming, based on the response, that the new relationship may be established.

In sum, it was a drawback of the prior art that a company did not have a reliable method for establishing relationships and trusts with other companies that it does not know. With the present invention, companies can initiate business relationships on a trusted basis with companies within a specified number of degrees of separation between itself and the desired company. Thus, the present invention overcomes the drawbacks of the prior art and provides a solution that enables entities to discover, extend, validate and establish business relationships over a digital network.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. For example, the present invention may be used in connection with data networks that exchange information or content, such as the networks described in co-pending U.S. patent application Ser. No. 09/817,917, filed Mar. 26, 2001, the disclosure of which is hereby incorporated by reference in its entirety. One skilled in the art will appreciate that the access rights and/or usage rules described in the co-pending application may incorporate the transitive trust concepts disclosed above. Consequently, the specification and drawings are, therefore, to be regarded in an illustrative rather than restrictive sense.

What is claimed is:

1. A computer-readable medium having computer-executable instructions for performing steps comprising:
   a) generating at least one entity trust list containing at least one characteristic of at least two of the entities, a level of trust being gauged by the at least one characteristic;
   b) generating at least one transactional trust list containing at least one parameter relative to an exchange between at least two of the entities through at least one degree of separation between the entities, the at least one parameter comprising a proxy parameter, the proxy parameter being indicative of an action that a trusted party can perform on behalf of a trusting party; and
   c) creating at least one receiving component that obtains information from the at least one entity trust list and the at least one transactional trust list in order to provide a framework for at least two of the entities to establish relationships between one another.

2. The computer-readable medium of claim 1, wherein the plurality of interconnected entities correspond to nodes on a network.

3. The computer-readable medium of claim 2, wherein the network is a wide area network.

4. The computer-readable medium of claim 2, wherein the network is the Internet.

5. The computer-readable medium of claim 2, wherein the entities are business entities, and wherein the system provides a framework for the business entities to discover, validate and establish business relationships over the network.

6. The computer-readable medium of claim 1, wherein the at least two entities have capabilities of sharing information about other entities, each of the other entities being at least one of a business partner and a known contact.

7. The computer-readable medium of claim 1, wherein the entity trust list contains, for a respective entity, at least one of: names of known entities and identifying characteristics thereof; previous transactions between the respective entity and other entities; historical transactions between the respective entity and other entities; quality ratings of the historical transactions; overall rating of other entities; and map of entity relationships.

8. The computer-readable medium of claim 7, wherein the map of entity relationships includes at least information that identifies entities and which other entities they know, and information about how relationships were formed between such entities.

9. The computer-readable medium of claim 1, wherein the transactional trust list has proxy trust parameters and activity trust parameters.

10. The computer-readable medium of claim 9, wherein the proxy trust parameters include at least: an ability of a respective entity to forward requests to other trusted entities; ability to add new entities as trusted entities; ability to communicate opinions about a predetermined entity to other entities; and ability to dynamically create proxy parameters that are specified by any two cooperating entities.

11. The computer-readable medium of claim 9, wherein activity trust parameters include at least one of: types of transactions a respective entity can handle; activity trust levels; and past activity with a predetermined entity.

12. A computer-readable medium having computer-executable instructions for performing steps comprising:
   a) generating an entity trust list containing at least one characteristic of at least two of the entities, a level of trust being gauged by the at least one characteristic;
   b) generating a transactional trust list containing at least one parameter relative to an exchange between at least two of the entities through at least one degree of separation between the entities, the at least one parameter comprising a proxy parameter, the proxy parameter being indicative of an action that a trusted party can perform on behalf of a trusting party;
   c) generating a capability domain and activity trust level data base for each of the at least two entities, the data base having a plurality of levels of trust and a plurality of entity roles, the capability domain and activity trust data base comprising a plurality of entries, each entry being indexed by an entity role and a level of trust, each said entry being indicative of a corresponding business process; and
   d) creating at least one receiving component that obtains information from the entity trust list and the transactional trust list in order to provide a framework for at least two of the entities to establish relationships between one another.

13. The computer-readable medium of claim 12, wherein each respective role in the plurality of roles defines a respective function that one entity fulfills to another entity.

14. The computer-readable medium of claim 12, wherein each respective level of trust in the plurality of levels of trust defines a respective degree of trust between one entity and another entity.

15. The computer-readable medium of claim 12, wherein a respective business process of a plurality of business processes is associated with each combination of a respective role of the plurality of roles and a respective trust level of the plurality of trust levels.

16. The transitive trust network system of claim 12, wherein the corresponding business process is selected from a group consisting of a design process, a source process, a plan process, a buy process, a make process, a sell process, a fulfill process, and a service process.

17. The transitive trust network system of claim 12, wherein the entity trust list includes an overall trust score between two entities, the overall trust score being determined from an associated plurality of entries of the capability domain and activity trust level data base.

18. A computer-readable medium having computer-executable instructions for performing steps comprising:
   creating a trust component that stores a trust level for each directly interconnected entity and at least one corresponding valuation criterion for determining the trust level and that obtains an associated trust level of a sought entity through an interconnected intermediate entity if the sought entity is not directly interconnected to the selected entity, the trust component comprising:
      an entity trust portion that includes a first data structure, the first data structure storing a distinguishing characteristic of each said directly interconnected entity, a degree of trust being indicative of the distinguishing characteristic; and
      a transactional trust portion that includes a second data structure, the second data structure including a plurality of transactional parameters, the plurality of transactional parameters being indicative of criteria for conducting the new business relationship, the plurality of transactional parameters comprising:
         a proxy parameter that is indicative of an activity, the activity being performed by a trusted party on behalf of a trusting party; and
         a plurality of activity-trust parameters being indexed by an activity trust domain and a capability domain, the activity trust domain being indicative of an activity trust level, the capability domain being indicative of an activity process level, each activity-trust parameter being indicative of an associated business process; and
   creating a transactional component that provides peer-to-peer capability for sharing information with the other interconnected entity, the transactional component utilizing information from the trust component.

19. The computer-readable medium of claim 12, wherein the at least one parameter includes another proxy trust parameter that supports an ability of a respective entity to forward requests to other trusted entities.

20. The computer-readable medium of claim 12, wherein the at least one parameter includes another proxy trust parameter that supports an ability to add new entities as trusted entities.

* * * * *